United States Patent
Nakagawara

(10) Patent No.: US 9,906,731 B2
(45) Date of Patent: Feb. 27, 2018

(54) IMAGING APPARATUS, METHOD FOR CONTROLLING THE SAME, AND STORAGE MEDIUM

(71) Applicant: CANON KABUSHIKI KAISHA, Tokyo (JP)

(72) Inventor: Naoyuki Nakagawara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 119 days.

(21) Appl. No.: 14/268,881

(22) Filed: May 2, 2014

(65) Prior Publication Data

US 2014/0333799 A1 Nov. 13, 2014

(30) Foreign Application Priority Data

May 10, 2013 (JP) ................................ 2013-100546

(51) Int. Cl.
*H04N 5/235* (2006.01)

(52) U.S. Cl.
CPC ......... *H04N 5/2357* (2013.01); *H04N 5/2353* (2013.01)

(58) Field of Classification Search
CPC .... H04N 5/2357; H04N 5/2353; H04N 5/235; H04N 9/735; H04N 9/045; H04N 9/73
See application file for complete search history.

(56) References Cited

U.S. PATENT DOCUMENTS

| | | | | |
|---|---|---|---|---|
| 5,495,313 A * | 2/1996 | Kai | ................. | G03B 7/09979 396/121 |
| 5,515,132 A * | 5/1996 | Iwasaki | ............. | G03B 7/09979 356/215 |
| 7,471,316 B2 * | 12/2008 | Takahashi | .............. | H04N 5/235 348/226.1 |
| 7,598,987 B2 * | 10/2009 | Desprez-Le Goarant | | H04N 5/2351 330/254 |
| 7,825,959 B2 * | 11/2010 | Desprez-le-Goarant | | H04N 5/235 348/226.1 |
| 8,441,551 B2 * | 5/2013 | Greenland | ............ | G03B 19/18 348/228.1 |
| 2011/0096193 A1* | 4/2011 | Egawa | .................. | H04N 5/235 348/226.1 |
| 2011/0157415 A1* | 6/2011 | Goh | ..................... | H04N 5/2357 348/226.1 |
| 2011/0181753 A1* | 7/2011 | Sugie | ................. | H04N 5/23296 348/226.1 |

FOREIGN PATENT DOCUMENTS

| | | |
|---|---|---|
| JP | 2006-222935 A | 8/2006 |
| JP | 2007336470 A | 12/2007 |
| JP | 2010114834 A | 5/2010 |
| JP | 2012044244 A | 3/2012 |

* cited by examiner

*Primary Examiner* — Luong T Nguyen
(74) *Attorney, Agent, or Firm* — Canon U.S.A., Inc. IP Division

(57) ABSTRACT

An imaging apparatus has a first mode in which a detection unit detects a light amount change characteristic from an object between first and second exposures of an imaging unit during a continuous shooting and a determination unit determines an exposure timing of the second exposure based on the detected light amount change characteristic.

9 Claims, 8 Drawing Sheets

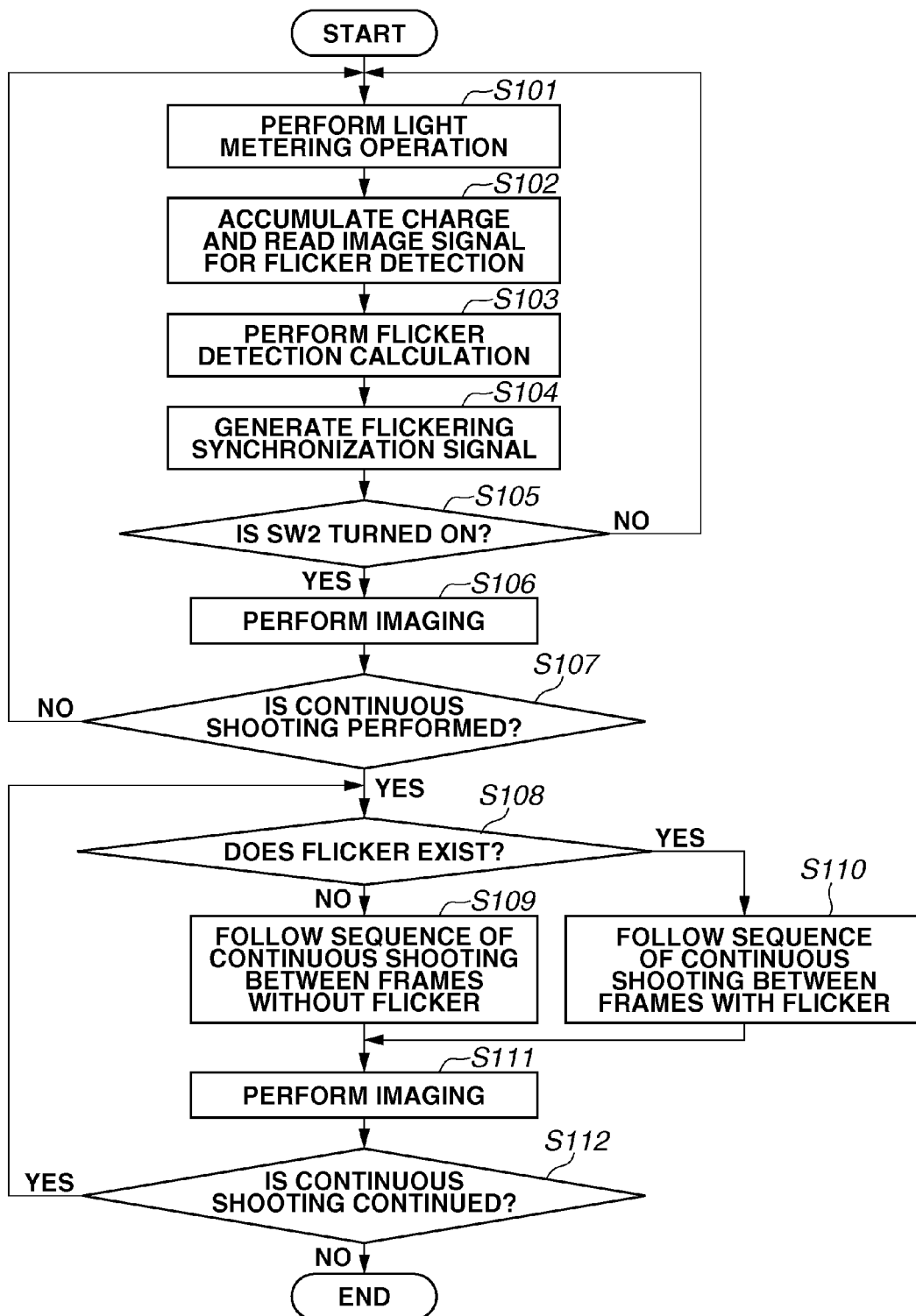

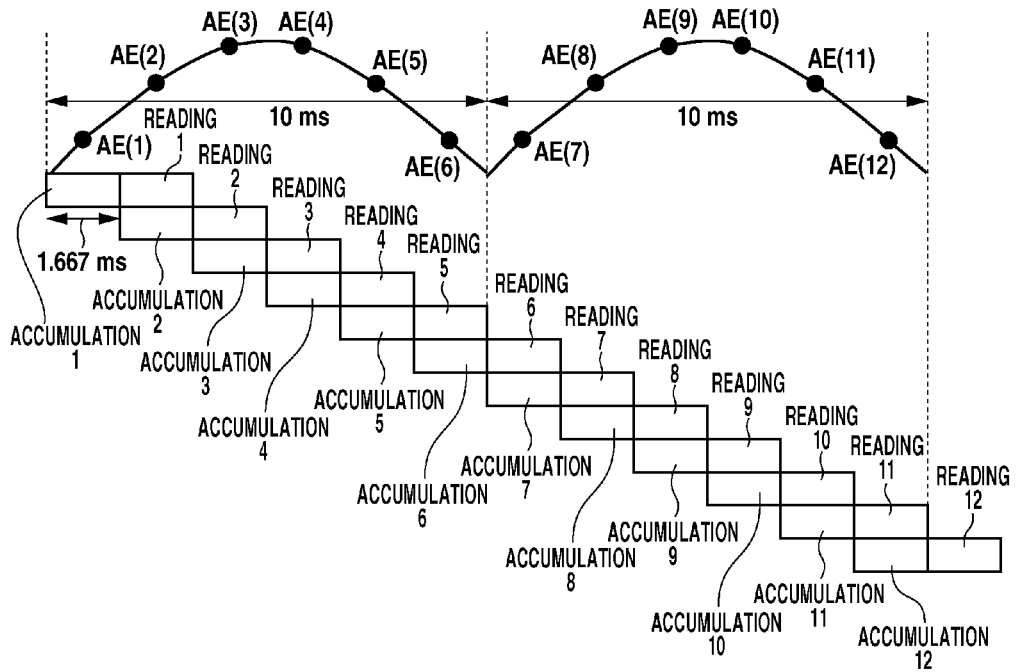
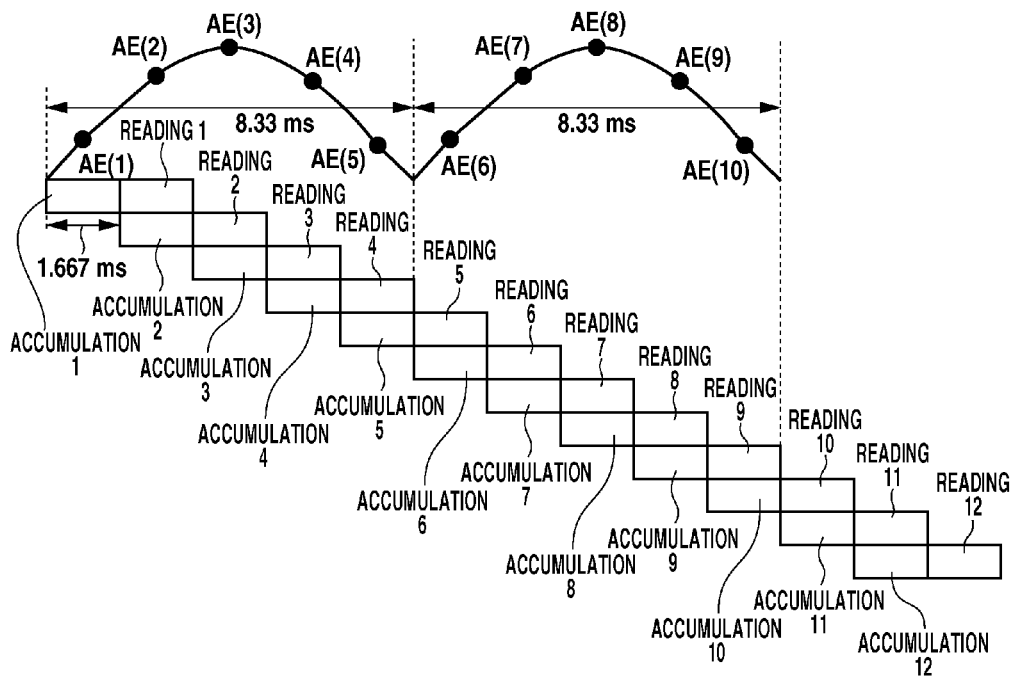

FIG.4

| THE NUMBER OF VERTICAL PIXELS TO BE ADDED | READING TIME (1V TIME) |
|---|---|
| 1 (READING ALL PIXELS) | 6.25 ms |
| 2 | 3.63 ms |
| 3 | 2.75 ms |
| 4 | 2.33 ms |
| 5 | 2.09 ms |
| 6 | 1.90 ms |
| 7 | 1.81 ms |
| 8 | 1.73 ms |
| 9 | 1.66 ms |
| 10 | 1.62 ms |

FIG.7

| SHUTTER SPEED | T_ShutterWait |
|---|---|
| 1/125 ~ 1/160 | 0 ms |
| 1/161 ~ 1/200 | 1.5 ms |
| 1/201 ~ 1/250 | 2 ms |
| 1/251 ~ 1/500 | 3 ms |
| 1/501 ~ 1/1000 | 3.5 ms |
| 1/1001 ~ 1/2000 | 3.75 ms |
| 1/2001 ~ | 4 ms |

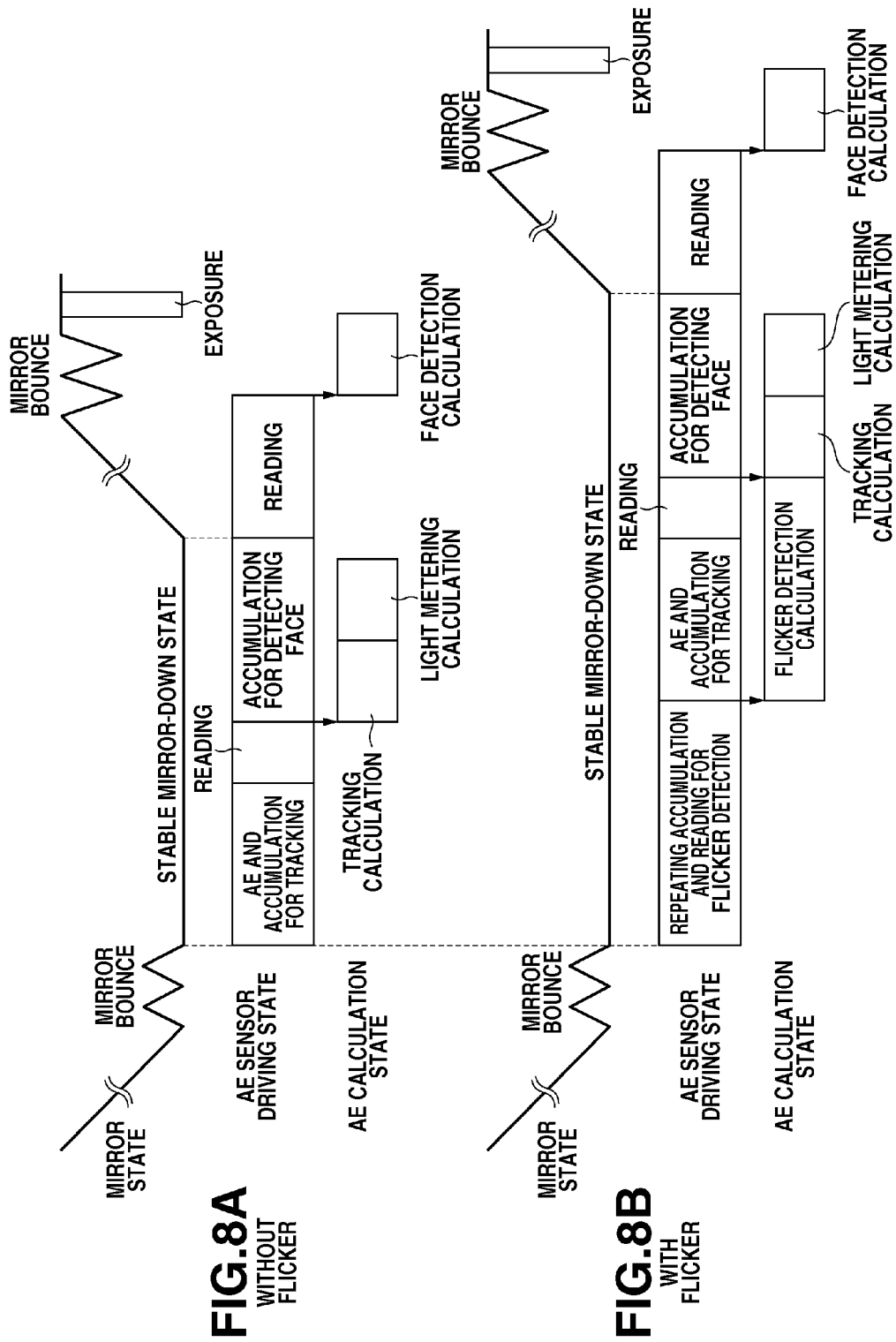

IMAGING APPARATUS, METHOD FOR CONTROLLING THE SAME, AND STORAGE MEDIUM

BACKGROUND OF THE INVENTION

Field of the Invention

The present invention relates to a technique for suppressing influence of flicker occurring under an artificial light source such as a fluorescent light in particular.

Description of the Related Art

In recent years, an imaging apparatus, such as a digital camera and a cellular phone camera, has been improved in sensitivity. Therefore, a bright image with reduced image blur can be obtained by a high shutter speed (i.e., a short exposure time) imaging even under a comparatively dark environment, e.g., indoors.

The fluorescent lamp generally used as an indoor light source causes flicker, i.e., a phenomenon in which an illumination light periodically flickers, by influence of a frequency of the commercial power supply. A high shutter speed imaging performed under such a light source causing the flicker (hereinbelow, referred to as a flickering light source) may cause unevenness in exposure and color in an image or cause variation in exposure and color temperature among a plurality of continuously captured images.

To solve this problem, Japanese Patent Application Laid-Open No. 2006-222935 discusses a technique in which the state of flicker of an illumination light is detected and, if an exposure time is shorter than a blinking period of the flicker, an imaging timing is adjusted so that the center of the exposure time can be approximately matched with timing at which the amount of the illumination light indicates a maximum value.

However, the following problem occurs because the technique discussed in Japanese Patent Application Laid-Open No. 2006-222935 adjusts each of the imaging timing at which a plurality of images is continuously captured based on the phase of the maximum value of the amount of the illumination light detected before starting to continuously capture a plurality of images.

In general, it has been known that the frequency of the commercial power supply fluctuates with respect to a reference frequency (for example, fluctuate of ±0.2 Hz in Japan). More specifically, the flicker of the flickering light source causes a fluctuation about twice as much as the fluctuation of the commercial power supply with respect to a reference blinking period. For this reason, a difference in timing tends to be large between a peak timing of light amount of the flickering light source obtained from the detection result of flicker and an actual peak timing of the light amount of the flickering light source according as time elapses after the flicker is detected.

In the technique discussed in Japanese Patent Application Laid-Open No. 2006-222935, therefore, as an image is captured later in continuously capturing a plurality of images, the difference between the peak timing obtained from the detection result and the actual peak timing become greater. Consequently, it becomes more difficult to suppress the influence of the flicker.

SUMMARY OF THE INVENTION

According to an aspect of the present invention, an imaging apparatus includes an imaging unit, a detection unit configured to detect a light amount change characteristic of light from an object, and a determination unit configured to determine an exposure timing of the imaging unit, wherein the imaging apparatus has a first mode in which the detection unit detects the light amount change characteristic between first and second exposures of the imaging unit during the continuous shooting and the determination unit determines the exposure timing of the second exposure based on the detected light amount change characteristic.

Further features of the present invention will become apparent from the following description of exemplary embodiments with reference to the attached drawings.

BRIEF DESCRIPTION OF THE DRAWINGS

FIG. 2 is a flowchart illustrating an operation for imaging with reduced influence of flicker on the imaging apparatus according to the exemplary embodiment of the present invention.

FIGS. 3A and 3B are diagrams each illustrating accumulation timings of charges and reading timings of image signals for detecting flicker.

FIG. 4 is a table illustrating a relationship between the number of vertical pixels to be added and a reading time.

FIG. 7 is a table illustrating values of T_ShutterWait and values of shutter speed, being associated with each other.

FIGS. 8A and 8B are diagrams each illustrating operational sequence of a light metering sensor and an ICPU between frames of continuous shooting.

DESCRIPTION OF THE EMBODIMENTS

Various exemplary embodiments, features, and aspects of the invention will be described in detail below with reference to the drawings.

Figure 1:
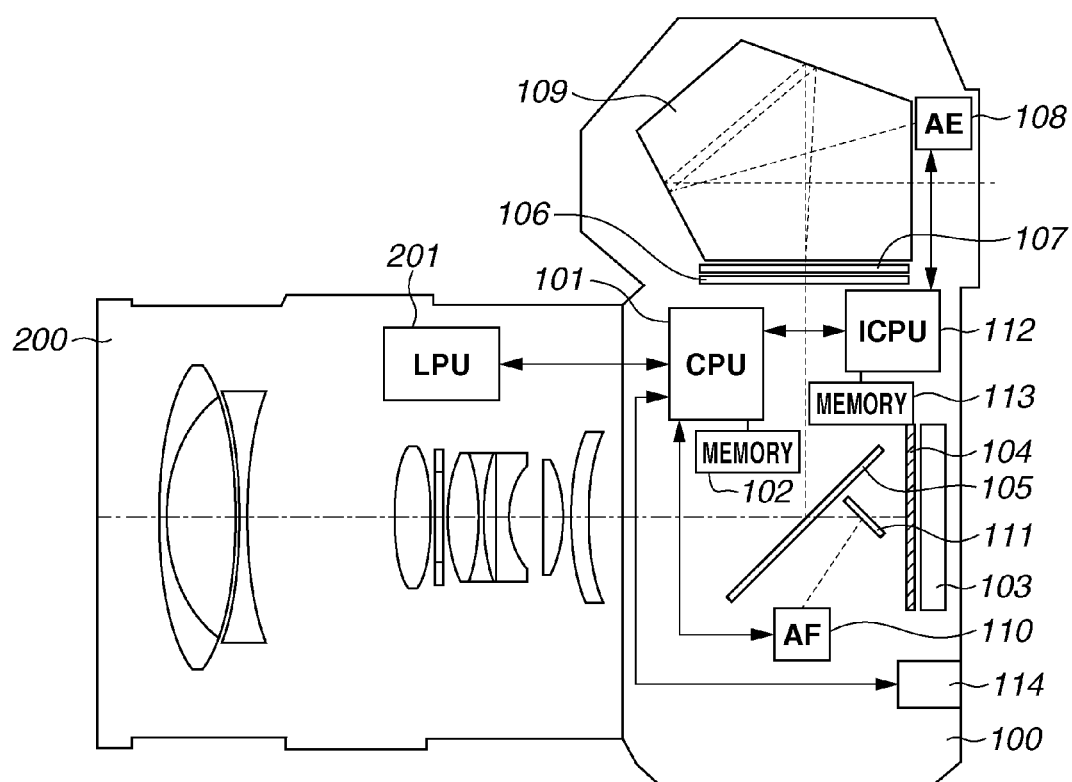
FIG. 1 is a schematic configuration diagram of an imaging apparatus according to an exemplary embodiment of the present invention.

FIG. 1 is a schematic configuration diagram illustrating an imaging apparatus according to the present exemplary embodiment. The imaging apparatus according to the present exemplary embodiment includes a camera main body 100 and a lens unit 200 detachably attached on the camera main body 100.

The configuration of the camera main body 100 is described below. A microcomputer CPU (hereinbelow, referred to as a camera microcomputer) 101 controls each unit of the camera main body 100. A memory 102 includes, for example a random access memory (RAM) and a read only memory (ROM), which are connected with the camera microcomputer 101.

An image sensor 103 includes, for example, a charge coupled device (CCD) sensor and a complementary metal oxide semiconductor (CMOS) sensor including an infrared cut filter and a low-pass filter. The image sensor 103 photoelectrically converts light flux being incident via the lens unit 200, and outputs an image signal.

A shutter 104 travels so as to be in a light shielding state in which the image sensor 103 is shielded from the light flux being incident via the lens unit 200 and so as to be in a retreating state in which the light flux being incident via the lens unit 200 is guided to the image sensor 103.

A half mirror 105 is movable to a position where the light flux being incident via the lens unit 200 is guided to the image sensor 103 (a mirror up state) and a position where the light flux being incident via the lens unit 200 is guided to a light metering sensor 108 (a mirror down state). In other words, the half mirror 105 changes a light path of the light flux incident via the lens unit 200 by moving between the positions for the states in which the light flux is guided to the image sensor 103 and the light flux is guided to the light metering sensor 108. If the half mirror 105 is in the position where the light flux is guided to the light metering sensor 108, the light flux being incident via the lens unit 200 is imaged on a focus plate 106.

A display element 107 uses a polymer network (PN) liquid crystal and displays a frame (an auto focus (AF) frame) indicating a focus detection area used for AF control. The light metering sensor 108 uses a charge accumulation image sensor, such as the CCD sensor and the CMOS sensor, for accumulating charges corresponding to the amount of incident light. Thus, not only light metering, but also face detection of an object, object tracking, and detection of flicker based on an image signal to be output can be performed. A penta-prism 109 guides the light flux which is incident via the lens unit 200 and reflected by the half mirror 105 to the light metering sensor 108 and an optical finder (not illustrated). A focus detection circuit 110 detects a focus to perform the AF control. An AF mirror 111 guides a part of the light flux which is incident via the lens unit 200 and passes through the half mirror 105.

A central processing unit (CPU) 112 (hereinbelow, referred to as ICPU) is used for the drive control, image processing, and calculation of the light metering sensor 108. The ICPU 112 performs various calculations related to the light metering, the face detection and the object tracking, and the detection of flicker (detection of a light amount change characteristic from the object) based on an output signal (image signal) from the light metering sensor 108. A memory 113 is a RAM and a ROM connected with the ICPU 112. In the present exemplary embodiment, a configuration including the ICPU 112 separately from the camera microcomputer 101 is described below. Processing executed by the ICPU 112 may be executed by the camera microcomputer 101.

An operation unit 114 includes a release button by which a user instructs the camera main body 100 to start an imaging preparation operation and an imaging operation and a setting button by which the user performs various settings of the camera main body 100. The operation unit 114 also includes a power supply switch by which the user switches the power supply of the camera main body 100, a mode dial by which the user selects an operation mode of the camera main body 100 from among a plurality of modes, and a touch panel.

The configuration of the lens unit 200 is described below. A lens CPU 201 (hereinbelow, referred to as LPU) controls units of the lens unit 200, for example, a driving unit of a focus lens, a zoom lens, and a diaphragm, and transmits information about the lens to the camera microcomputer 101.

An operation for imaging with reduced influence of flicker is described below with reference to FIG. 2. FIG. 2 is a flowchart illustrating the operation for imaging with reduced influence of flicker on the imaging apparatus according to the present exemplary embodiment.

In step S101, a light metering operation is performed when the power supply of the camera main body 100 is turned on by the user's operation of the power supply switch. In the light metering operation, the light metering sensor 108 accumulates charges and reads the image signal. The ICPU 112 performs calculation (hereinbelow, referred to as light metering calculation) based on the obtained image signal to obtain a light metering value.

An accumulation time of the light metering sensor 108 is set to be an approximate integer multiple of a light amount change period of the flickering light source so that the light metering value does not disperse even under the flickering light source due to changes in a light amount of the flickering light source. A frequency at which the light amount of the flickering light source changes (hereinbelow, referred to as a flickering frequency) is twice the commercial power supply frequency, so that the flickering frequency is 100 Hz in an area where the commercial power supply frequency is 50 Hz and the light amount change period is 10 ms. Similarly, the flickering frequency is 120 Hz in an area where the commercial power supply frequency is 60 Hz and the light amount change period is 8.33 ms.

To deal with the two types of the flickering frequencies, the accumulation time of the light metering sensor 108 is set to 9 ms which is approximately equal to a mean value of 10 ms and 8.33 ms. Then, the accumulation time of the light metering sensor 108 becomes approximately equal to a light amount change period of the flickering light source irrespective of which commercial power supply frequency of 50 Hz or 60 Hz is used. Therefore, the light metering value can be stably obtained even under the flickering light source.

The camera microcomputer 101 determines a diaphragm value Av, a shutter speed (exposure time) Tv, and an International Organization for Standardization (ISO) sensitivity (imaging sensitivity) Sv, which are exposure control values, based on the obtained light metering value. The camera microcomputer 101 determines the diaphragm value Av, the shutter speed Tv, and the ISO sensitivity Sv by using a program diagram previously stored in the memory 102.

In step S102, as illustrated in FIGS. 3A and 3B, the light metering sensor 108 accumulates charges and reads the image signal for the flicker detection several times. FIGS. 3A and 3B are diagrams each illustrating accumulation timings of charges and reading timings of the image signals for the flicker detection. The accumulation and reading are continuously performed 12 times at 600 fps and at a period of about 1.667 ms. The 600 fps is equal to the lowest common multiple of previously assumed flickering frequencies (100 Hz and 120 Hz). The accumulation performed 12 times at 600 fps means that the accumulation is performed at a period of 20 ms as a whole, which means that two periods of light amount change of the flickering light source are included irrespective of which commercial power supply frequency of 50 Hz or 60 Hz is used.

A method for driving the light metering sensor 108 at 600 fps (a period of 1.667 ms) is described below.

In the present exemplary embodiment, not only the light metering, but also the face detection of an object, the object tracking, and the detection of flicker are performed based on the image signal output from the light metering sensor 108. The light metering sensor 108 needs to have the number of pixels equivalent to, for example, that of the Quarter Video Graphics Array (QVGA) to accurately perform the face detection of the object. The circuit configuration is complicated and its cost is also increased to read signals of all pixels of the image sensor having the number of pixels, at which the face detection of the object can be accurately performed, at a frame rate of 600 fps or higher.

For the image signals to be used for the face detection of the object, the signals of all pixels are read. For the image signals to be used for the flicker detection, pixel addition reading or thinning reading is performed to adjust the frame rate to 600 fps (a period of 1.667 ms).

If a CCD sensor is used for the light metering sensor 108, the number of reading lines may be reduced in a pseudo manner to shorten the reading time by the pixel addition reading in which reading is performed by adding a pixel signal. For example, a vertical pixel addition is performed by a CCD sensor, having pixels arranged in a stripe form, to shorten the reading time illustrated in FIG. 4. FIG. 4 is a table illustrating a relationship between the number of vertical pixel addition and the reading time. It is presumed that a CCD sensor, as an example, whose reading time is 6.25 ms in a case where all pixel signals are read without adding pixel signals (the number of added vertical pixels is one) is used. In the case of using the CCD sensor having a characteristic illustrated in FIG. 4, nine pixels are added to obtain a reading time of 1.66 ms. Thus, a frame rate of about 600 fps can be realized. The number of pixels of image signal to be read in the vertical direction is reduced to ⅑ compared with the image signal read without adding the pixel signal. However, it is no problem using even the image signal having reduced number of pixels in the vertical direction because light metering values between the image signals are merely compared in the flicker detection.

If a CMOS sensor is used for the light metering sensor 108, a total time of accumulation and reading may be adjusted to a period of about 1.667 ms by a so-called thinning reading in which horizontal lines for reading the image signal are limited.

The method for driving the light metering sensor at about 600 fps (at the period of about 1.667 ms) is described above. The period of accumulation and reading of the light metering sensor described above is merely an example. The frame rate does not always need to be about 600 fps (the period of about 1.667 ms). For example, the longer the accumulation time, the more effective for the light metering sensor in an environment with a low illuminance, so that an accumulation time can be made longer than approximately 1.667 ms and the frame rate can be made smaller than 600 fps. Alternatively, the shorter an accumulation and reading period, the shorter a time required for the flicker detection, so that an accumulation time can be made shorter than approximately 1.667 ms. At the same time, the frame rate can be made larger than 600 fps by changing the number of vertical pixel addition to the number of pixel addition at which a reading time becomes shorter than 1.66 ms. The relationship between the number of vertical pixel addition and the reading time illustrated in FIG. 4 is merely an example. However, the farther the frame rate is apart from 600 fps, the greater the displacement between the accumulation and reading period of the light metering sensor and the light amount change period of the flickering light source, so that it is desirable that the frame rate is equal to 600 fps or 600 fps±1% to 2%.

After the light metering sensor 108 finishes accumulating charges and reading the image signal for the flicker detection in step S102, in step S103, the ICPU 112 performs a flicker detection calculation based on the read image signal.

FIG. 3A illustrates the accumulation timing of charges, the reading timing of the image signal, and the transition of the light metering values at the commercial power supply frequency of 50 Hz. An n-th accumulation is taken as "accumulation n", the n-th reading of the accumulation n is taken as "reading n," and the light metering value obtained from the result of the reading n is taken as "AE(n)." Only a light metering value is obtained by each accumulation but the light amount of the flickering light source is not constant also in the accumulation period. Then, the light metering value obtained by each accumulation is taken as a value corresponding to the light amount of the flickering light source at a central point of time during each accumulation period.

The light amount change period of the flickering light source at the commercial power supply frequency of 50 Hz is approximately 10 ms, 10/1.667≈6, as illustrated in FIG. 3A, so that accumulation at a timing at which the light amount of the flickering light source is approximately equal is performed in 6-period cycle. In other words, a relationship of AE(n)≈AE(n+6) is obtained.

Similarly, the light amount change period of the flickering light source at the commercial power supply frequency of 60 Hz is approximately 8.33 ms, 8.33/1.667≈5, as illustrated in FIG. 3B, so that the accumulation at a timing at which the light amount of the flickering light source is approximately equal is performed in 5-period cycle. In other words, a relationship of AE(n)≈AE(n+5) is obtained.

On the other hand, under a light source without the light amount change, AE(n) is substantially constant irrespective of n. Then, an evaluation value is calculated using the following equations (1) and (2) based on a plurality of light metering values obtained by performing an accumulation for the flicker detection.

$$F50 = \sum_{n=1}^{6} |AE(n) - AE(n+6)| \quad (1)$$

$$F60 = \sum_{n=1}^{6} |AE(n) - AE(n+5)| \quad (2)$$

It is presumed that the evaluation value calculated using the equation (1) is taken as F50, and the evaluation value calculated using the equation (2) is taken as F60. The evaluation values F50 and F60 are compared with a predetermined threshold F_th to perform the flicker detection. More specifically, in a case where F50<F_th and F60<F_th, all of a plurality of light metering values obtained by performing the accumulation for the flicker detection are substantially equal to each other, so that it is determined that the flicker does not occur. In a case where F50<F_th and F60≥F_th, the plurality of light metering values obtained by performing the accumulation for the flicker detection is substantially equal to each other at the 6-period cycle, but that is not substantially equal to each other at the 5-period cycle. Therefore, it is determined that the flicker with a light amount change period of 10 ms occurs (under the flickering light source of the commercial power supply frequency of 50 Hz).

In a case where F50≥F_th and F60<F_th, the plurality of light metering values obtained by performing the accumulation for the flicker detection is substantially equal to each other at the 5-period cycle, but that is not substantially equal to each other at the 6-period cycle. Therefore, it is determined that the flicker with a period light amount change of 8.33 ms occurs (under the flickering light source of the commercial power supply frequency of 50 Hz).

If an imaging apparatus is moved, for example by panning, or an object is moved while an accumulation for the flicker detection is being performed, the light metering value may be significantly changed to be F50≥F_th and F60≥F_th. In that case, F50 is compared with F60 to perform the flicker detection.

More specifically, in a case where F50≥F_th, F60≥F_th, and F50≤F60, it is determined that the flicker with the light amount change period of 10 ms occurs (under the flickering light source of the commercial power supply frequency of 50 Hz). On the other hand, in a case where F50≥F_th, F60≥F_th, and F50>F60, it is determined that the flicker with the light amount change period of 8.33 ms occurs (under the flickering light source of the commercial power supply frequency of 60 Hz). In a case where F50 ≥F_th, F60≥F_th, and F50=F60, the light amount change period of the flickering light source cannot be determined, so that it may be determined that the flicker does not occur or cannot be detected.

Although the light amount change period of the flickering light source is determined in a case of F50≥F_th and F60≥F_th, the accuracy of the flicker detection is low in the case of F50≥F_th and F60≥F_th, so that the accumulation for the flicker detection may be retried.

Figure 5:
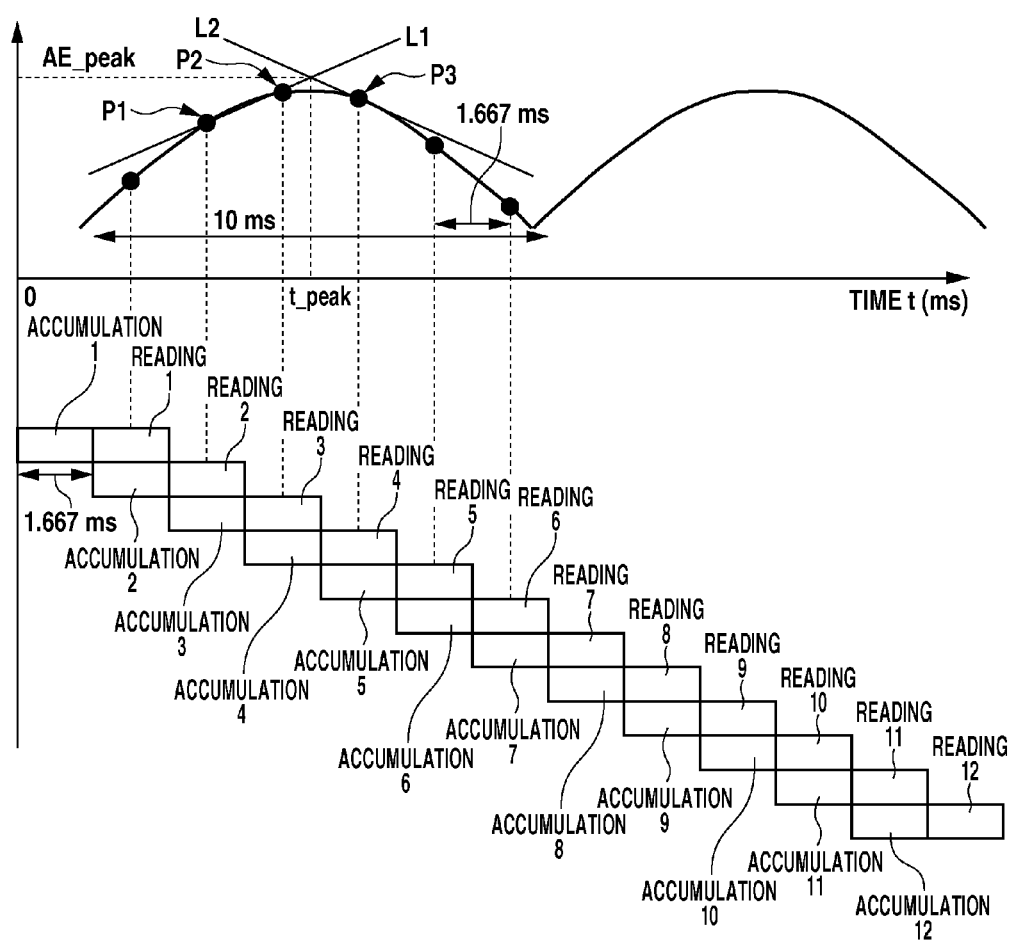
FIG. 5 is a diagram illustrating an example of a method for calculating the peak timing of light amount of a flickering light source.

Furthermore, in step S103, if the processing is performed under the flickering light source, the ICPU 112 determines the timing of a feature point of the flicker. FIG. 5 is a diagram illustrating an example of a method for calculating the peak timing of light amount of a flickering light source, which is an example of the timing of a feature point of the flicker.

A point at which the maximum value is obtained in AE (1) to AE (12) is taken as P2 (t(m), AE(m)). A point preceding the above point by one and indicating the result of light metering is taken as P1 (t(m−1), AE(m−1)). A point following the above point by one is taken as P3 (t(m+1), AE(m+1)). A straight line passing through AE (m−1) or AE (m+1), whichever is smaller (P1 illustrated in FIG. 5), and the point P2 is obtained as L1=at+b. A straight line passing through AE (m−1) or AE (m+1), whichever is larger (P3 illustrated in FIG. 5), and having an inclination of −a is taken as L2. By determining the intersection of the L1 and the L2, a peak light-metering value of AE_peak corresponding to the light amount at the time of peak and a peak timing of t_peak where the accumulation starting time for the flicker detection is taken as 0 ms.

Although the method for calculating the timing at which the light amount reaches the maximum (peak) in change in the light amount of the flicker as an example of a method for calculating the timing of a feature point of the flicker is described above with reference to FIG. 5. Alternatively, a timing at which the light amount reaches the minimum (bottom) may be calculated.

Figure 6:
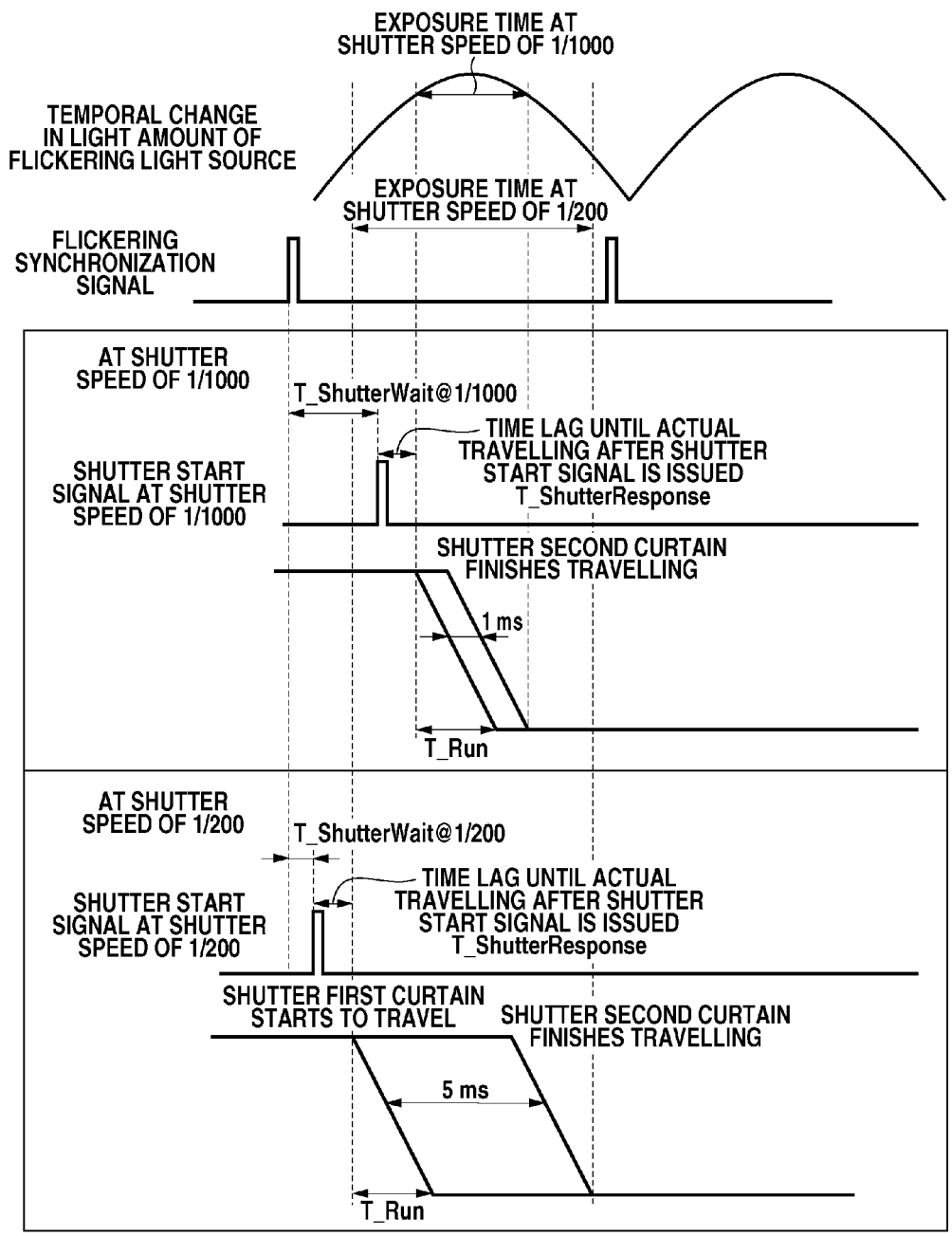
FIG. 6 is a diagram illustrating a relationship among change in a light amount of the flickering light source, a flickering synchronization signal, and timing at which the shutter start signal is generated.

In step S104, the camera microcomputer 101 generates a flickering synchronization signal from the flickering frequency determined in step S103 and the timing of light amount change. As illustrated in FIG. 6, the flickering synchronization signal is generated every one cycle of change in the light amount of the flickering light source and synchronized with a predetermined timing of light amount change of the flickering light source. FIG. 6 is a diagram illustrating a relationship among the light amount change of the flickering light source, the flickering synchronization signal, and the timing at which the shutter start signal is generated.

In FIG. 6, a time lag occurring by the time the shutter 104 actually travels and starts exposing a first line in the imaging area of the image sensor 103 after the shutter start signal is issued is taken as T_ShutterResponse. A period of time from a start of the exposure of a first line to a start of the exposure of a final line in the imaging area of the image sensor 103 is taken as T_Run. In a case where the exposure is started all over the imaging area of the image sensor 103 at the same time, it is advisable that T_Run=0.

The generation timing of the flickering synchronization signal of t_Flicker can be expressed by the following equation if the accumulation start time for the flicker detection is taken as 0 ms.

$$t\_Flicker = t\_peak - T\_ShutterResponse - (T\_Run + TVmax)/2 + T \times n \quad (3)$$

A light amount change period T of the flickering light source and a peak timing of t_peak in a case where the accumulation start time for the flicker detection is taken as 0 ms are calculated in step S103. Where, n is a natural number and TVmax is a shutter speed which is a threshold value whereby to determine whether shutter control for reducing the influence of the flicker is performed and which is previously set.

If the shutter speed is slower than 1/100 seconds, exposure is performed at a time period longer than one period of the light amount change period of the flickering light source, which lessens the influence of the flicker. Even at the shutter speed that the exposure period does not satisfy a period of the light amount change period of the flickering light source, if the exposure period is close to a period of the light amount change period of the flickering light source, the influence of the flicker seems to be relatively small. In the present exemplary embodiment, if the shutter speed is higher than 8 ms, the shutter is controlled to lessen the influence of the flicker and TVmax is set to 1/125 (sec).

The camera microcomputer 101 sets T_ShutterWait which is a waiting time from the generation of the flickering synchronization signal to the generation of the shutter start signal which instructs the shutter 104 to start to travel. The camera microcomputer 101 changes the T_ShutterWait for each shutter speed to perform control such that the timing at which the light amount change of the flickering light source is small falls within the center of the time between the start of exposure on the first line and the end of exposure on the final line in the imaging area of the image sensor 103. For example, the camera microcomputer 101 sets the T_ShutterWait, as represented by the following equation (4).

$$T\_ShutterWait = (TVmax - TV)/2 \quad (4)$$

where, TV<1/125.

The T_ShutterWait is set as shown above to allow control such that the peak timing of light amount of the flickering light source falls within the center of the time between the start of exposure on the first line and the end of exposure on the final line in the imaging area of the image sensor 103. FIG. 7 is a table illustrating values of T_ShutterWait and values of shutter speed being associated with each other. The table illustrated in FIG. 7 may be previously stored in the memory 102.

The example in which the peak timing of light amount of the flickering light source is calculated in step S103 and the timing of generation of the flickering synchronization signal is set based on the peak timing of light amount of the flickering light source is described above. However, if the timing of bottom of light amount of the flickering light source is calculated in step S103, the generation timing the flickering synchronization signal may be set based on the timing of bottom of light amount of the flickering light source.

In step S105, the camera microcomputer 101 determines whether a switch SW2, which issues an instruction to start the imaging operation by a user's operation of a release button, is turned on. If the SW2 is not turned on (NO in step S105), the processing returns to step S101 and a series of operations from step S101 to step S104 is repeated to update the light amount change period of the flickering light source and the peak timing of light amount of the flickering light source. By repeating the series of operations from step S101 to step S104 at a period of approximately 100 ms, for example, allows the displacement of the light amount change period in 100 ms to fall within approximately ±0.4 ms at a maximum, even if the light amount change period of the flickering light source fluctuates at approximately ±0.4 Hz. Therefore, a shutter control accurately lessening the influence of the flicker can be performed whenever the SW2 is turned on.

The light metering operation in step S101 and the flicker detection operation in steps S102 to S104 may be performed at a different period instead of repeating the series of operations from step S101 to step S104. As described above, a period of approximately 100 ms is sufficient for the flicker detection operation, however, the light metering operation may be performed at a period of approximately 50 ms, for example, which is shorter than the period used for the flicker detection operation to improve the responsiveness to change in the luminance of an object.

If the SW2 is turned on (YES, in step S105), the processing proceeds to step S106. In step S106, the camera microcomputer 101 generates the shutter start signal delayed for T_ShutterWait according to the determined shutter speed with respect to the first flickering synchronization signal after the SW2 is turned on. Then, the shutter 104 is driven in response to the generated shutter start signal to perform imaging.

As described above, the shutter control for lessening the influence of the flicker is performed such that the shutter start signal is delayed only for T_ShutterWait according to the shutter speed with respect to the flickering synchronization signal. With such an arrangement, as illustrated in FIG. 6, the peak timing of light amount of the flickering light source falls within the center of the time between the start of exposure on the first line and the end of exposure on the final line in the imaging area of the image sensor 103 even at a shutter speed of 1/1000 seconds and 1/200 seconds. Thus, the imaging timing is controlled based on the timing of feature point of the flicker to allow the exposure unevenness due to the influence of the flicker to be reduced in an image. In step S107, after the imaging is finished, the camera microcomputer 101 determines whether a continuous shooting is performed. A decision as to whether the continuous shooting is performed can be made based on as to whether the SW2 is kept turned on or the continuous shooting mode is selected as an operation mode.

If the continuous shooting is not performed (NO in step S107), the processing returns to step S101. If the continuous shooting is performed (YES in step S107), the processing proceeds to step S108.

In step S108, the camera microcomputer 101 determines whether flicker exists. The determination can be performed using the determination result in step S103. If flicker does not exist (NO in step S108), the processing proceeds to step S109. If flicker exists (YES in step S108), the processing proceeds to step S110.

An operational sequence between frames of the continuous shooting (an interval of shooting in performing the continuous shooting) is described below with reference to FIGS. 8A and 8B. FIGS. 8A and 8B are diagrams each illustrating the operational sequence of the light metering sensor 108 and the ICPU 112 between the frames of the continuous shooting. FIGS. 8A and 8B illustrate the operational sequence without and with flicker, respectively. In step S109, the light metering sensor 108 and the ICPU 112 operate as illustrated in FIG. 8A. In step S110, the light metering sensor 108 and the ICPU 112 operate as illustrated in FIG. 8B.

The operational sequence of the light metering sensor 108 and the ICPU 112 between frames of the continuous shooting without the flicker is described below with reference to FIG. 8A.

The half mirror 105 being in the mirror-up state to guide the light flux to the image sensor 103 at the time of the imaging is moved to the position of the mirror-down state to guide the light flux to the light metering sensor 108 after the imaging. Immediately after the half mirror 105 is moved from the position of the mirror-up state to the position of the mirror-down state, the half mirror 105 bounces due to the shock of stop of the movement (hereinbelow, referred to as mirror bounce). When the mirror bounce converges to bring the half mirror 105 into the stable mirror-down state, the light metering sensor 108 accumulates charges for obtaining image signals used for metering light and the object tracking (hereinbelow, referred to as AE and accumulation for tracking) and reads image signals. It is preferable that the reading speed of the image signal associated with the AE and the accumulation for tracking is quick to increase the frame speed of the continuous shooting (continuous shooting speed). Therefore, if a CCD sensor is used for the light metering sensor 108, the pixel addition reading described above is performed. If a CMOS sensor is used for the light metering sensor 108, the thinning reading described above is performed. The ICPU 112 performs calculation related to the object tracking (hereinbelow, referred to as tracking calculation) and the light metering calculation based on the obtained image signal.

The light metering sensor 108 accumulates charges for obtaining image signals used for the face detection of an object (hereinbelow, referred to as accumulation for the face detection) and reads image signals after the image signal associated with the AE and the accumulation for tracking is read. The number of pixels to be added in the pixel addition reading and the number of thinning lines in the thinning reading are made fewer in reading the image signal associated with the accumulation for the face detection than in reading the image signal associated with the AE and the accumulation for tracking. In the present exemplary embodiment, all the pixels are read without the pixel addition reading and the thinning reading. The ICPU 112 performs calculation related to the face detection of the object (hereinbelow, referred to as face detection calculation) based on the obtained image signal. The result of the face detection calculation is used for the following tracking calculation and light metering calculation. The ICPU 112 performs the tracking calculation of the face area of the object detected by the face detection calculation as the object tracking or the light metering calculation with the weighting of the face area of the object detected by the face detection calculation increased.

It is preferable that the accumulation for the face detection is performed in parallel with the tracking calculation and the light metering calculation performed by the ICPU 112 to increase the frame speed of the continuous shooting (continuous shooting speed). The image signal associated with the accumulation for the face detection may be read without the light flux being guided to the light metering sensor 108. Therefore, it is preferable to read the image signal while the half mirror 105 is being moved to the position of the mirror-up state to increase the frame speed of the continuous shooting (continuous shooting speed).

When the mirror bounce caused by the movement converges to bring the half mirror 105 into the stable mirror-up state, the following imaging (exposure) is performed.

When the flicker does not exist, the continuous shooting is performed by such an operational sequence until the ON state of the SE2 is released. In other words, neither accumulating charges nor reading the image signal for the flicker detection is performed (hereinbelow, referred to as accumulation and reading for detecting flicker). Therefore, the flicker is not newly detected, and the timing of a feature point of the flicker is not calculated.

The operational sequence of the light metering sensor 108 and the ICPU 112 between frames of the continuous shooting with the flicker is described below with reference to FIG. 8B.

When the mirror bounce converges to bring the half mirror 105 into the stable mirror-down state, the light metering sensor 108 performs accumulation and reading for detecting flicker. The accumulation and reading for detecting flicker are performed by the method similar to that described in step S102 in FIG. 2.

It is improbable that the light source is changed into another light source having a different flickering frequency during the continuous shooting, so that the frequency as a reference of the flickering frequency during the continuous shooting may be considered as constant. The number of accumulation times of charges for the flicker detection can be made fewer than that in step S102 in FIG. 2 if the peak timing of light amount of the flickering light source can be calculated therewithin. The peak timing of light amount of the flickering light source can be calculated by the number of accumulation times that corresponds to a period of the light amount change period of the flickering light source. If the light amount change period of the flickering light source is approximately 8.33 ms, the accumulation is performed five times or more, and if the period is approximately 10 ms, the accumulation is performed six times or more, to allow accurately calculating the peak timing of light amount of the flickering light source. As described above, a simple accumulation for the flicker detection for calculating the peak timing of light amount of the flickering light source is performed between frames of the continuous shooting. Thus, decrease in the frame speed of the continuous shooting (continuous shooting speed) can be suppressed.

The ICPU 112 performs the flicker detection calculation based on the obtained image signal. The flicker detection calculation is performed by the method similar to that in step S103 in FIG. 2 as described above. As described above, the frequency as a reference of the flickering frequency during the continuous shooting may be considered as constant, so that only the peak timing of light amount of the flickering light source may be calculated without the light amount change period of the flickering light source being determined. At this point, the timing of feature point of the flicker represented by the latest detection result among the detection results is calculated.

After the flicker detection calculation is ended, the camera microcomputer 101 updates the flickering synchronization signal based on the detection result of the flicker detection calculation. In other words, the camera microcomputer 101 controls imaging timing based on the latest timing of feature point of the flicker calculated after the previous imaging.

The light metering sensor 108 finishes the accumulation and reading for the flicker detection, and then, performs the AE and accumulation for tracking and reading of the image signal. It is desirable to perform the AE and accumulation for tracking in parallel with the flicker detection calculation performed by the ICPU 112 to increase the frame speed of the continuous shooting (continuous shooting speed).

The accumulation for the face detection and various calculations performed thereafter are similar to the case where the flicker does not exist, as described in FIG. 8A, so that description thereof is omitted.

After the light metering calculation is ended, the camera microcomputer 101 generates the shutter start signal delayed for T_ShutterWait according to the shutter speed determined based on the latest result of the light metering calculation with respect to the latest flickering synchronization signal and performs the next imaging.

When the flicker exists, the continuous shooting is performed by the operational sequence described above until the ON state of the SE2 is released.

As described above, according to the present invention, even if the commercial power supply frequency somewhat fluctuates, an excellent image can be obtained because the peak timing of light amount of the flickering light source is calculated and each shooting is performed according to the calculated peak timing.

Although, according to the present exemplary embodiment, the example in which the half mirror 105 is provided and the light metering sensor 108 performs accumulation for various usages when the half mirror 105 is brought into the mirror-down state between the frames of the continuous shooting is described. However, the half mirror 105 does not necessarily need to be provided. In that case, the light metering sensor 108 does not need to be provided either. The image sensor 103 may perform accumulation for various usages similar to the accumulation therefore performed by the light metering sensor 108.

The sequence of various accumulations performed by the light metering sensor 108 illustrated in FIGS. 8A and 8B is merely an example. Various accumulations can be performed in a different sequence.

In FIGS. 8A and 8B, the accumulation of charges for obtaining image signals used for metering light and the accumulation of charges for obtaining image signals used for the object tracking are consolidated into one. However, those accumulations may be separately performed.

The object tracking and the face detection of the object do not necessarily need to be performed. When the flicker does not exist between the frames of the continuous shooting, the accumulation for the flicker detection is not performed. However, when the flicker exists between the frames of the continuous shooting, the accumulation for the flicker detection may be performed. When the flicker exists, the accumulation for the flicker detection is performed, so that the continuous shooting is lower in the frame speed than the continuous shooting performed when the flicker does not exist. However, reduction of the influence of the flicker can be accurately performed, and an excellent image can be obtained even if imaging is performed under the flickering light source. On the other hand, when the flicker does not exist, the accumulation for the flicker detection is not performed, so that the frame speed of the continuous shooting can be prevented from being unnecessarily decreased.

The present invention can also be realized by implementing the following processing. The processing is carried out such that software (program) realizing the functions of the above exemplary embodiment is supplied to a system or an apparatus via a network or various storage media and a computer (or CPU or MPU) of the system or the apparatus reads and executes a program code.

Although the preferred exemplary embodiment of the present invention is described above, the present invention is not limited to the exemplary embodiment but various modifications and changes may be made without departing from the spirit and scope of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-100546 filed May 10, 2013, which is hereby incorporated by reference herein in its entirety.

What is claimed is:

1. An imaging apparatus capable of continuous shooting, comprising:
    an imaging unit; and
    at least one processor that executes instructions stored in at least one memory to detect a periodical light amount change characteristic of light from an object;
        to determine an exposure timing of the imaging unit; and
        to perform control to execute, during the continuous shooting, a first mode or a second mode which is different from the first mode, based on the periodical light amount change characteristic detected before the continuous shooting is started,
    wherein in the first mode, the imaging apparatus detects the periodical light amount change characteristic in a period between first and second exposures of the imaging unit during the continuous shooting and an exposure timing of the second exposure is determined based on the periodical light amount change characteristic detected in the period,
    wherein the first mode is executed during the continuous shooting, if a change of an amount of light from the object changes in a predetermined period is detected before the continuous shooting is started,
    wherein the second mode is executed during the continuous shooting, if a change of the amount of light from the object changes in the predetermined period is not detected before the continuous shooting is started, and
    wherein in the second mode, the imaging apparatus does not detect the periodical light amount change characteristic of light from the object in the period between the first and the second exposures during the continuous shooting.

2. A control method for an imaging apparatus which includes an imaging unit and is capable of continuous shooting, the control method comprising:
    detecting a periodical light amount change characteristic of light from an object;
    determining an exposure timing of the imaging unit; and
    performing control to execute a first mode or second mode which is different from the first mode during the continuous shooting, wherein in the first mode, the periodical light amount change characteristic in a period between first and second exposures of the imaging unit during the continuous shooting and an exposure timing of the second exposure is determined based on the periodical light amount change characteristic detected in the period,
    wherein the control as to whether to execute the first mode is performed based on the detected periodical light amount change characteristic by detecting thereof before the continuous shooting is started,
    wherein the control so as to execute the first mode is performed during the continuous shooting, if that light from the object changes in a predetermined period is detected before the continuous shooting is started,
    wherein the control so as to execute a second mode is performed during the continuous shooting, if that the light from the object changes in the predetermined period is not detected before the continuous shooting is started, and
    wherein in the second mode, the imaging apparatus does not detect the light amount change characteristic of light from the object between the first and the second exposure during the continuous shooting.

3. A non-transitory computer-readable storage medium storing a program for causing a computer to execute a method for controlling an image apparatus which includes an imaging unit and is capable of continuous shooting, the control method comprising:
    detecting a periodical light amount change characteristic of light from an object;
    determining an exposure timing of the imaging unit; and
    performing control as to execute a first mode or second mode which is different from the first mode during the continuous shooting, wherein the first mode, the periodical light amount change characteristic is detected in a period between first and second exposures of the imaging unit during the continuous shooting, and an exposure timing of the second exposure is determined based on the periodical light amount change characteristic detected in the period,
    wherein the control as to whether to execute the first mode is performed based on the detected light amount change characteristic by detecting thereof before the continuous shooting is started,
    wherein the control so as to execute the first mode is performed during the continuous shooting, if that light from the object changes in a predetermined period is detected before the continuous shooting is started,
    wherein the control so as to execute a second mode is performed during the continuous shooting, if that the light from the object changes in the predetermined period is not detected before the continuous shooting is started, and
    wherein in the second mode, the imaging apparatus does not detect the periodical light amount change characteristic of light from the object in a period between the first and the second exposure during the continuous shooting.

4. The imaging apparatus according to claim 1, wherein an interval between the first and the second exposures in the second mode is shorter than the interval between the first and the second exposures in the first mode.

5. The imaging apparatus according to claim 1,
wherein the periodical light amount change characteristic of light from the object is information which includes a timing at which a light amount of flicker reaches a peak or a bottom, and
wherein the periodical light amount change characteristic is detected based on a plurality of images which is obtained by a plurality of charge accumulations performed during one period of a light amount change of flicker.

6. The imaging apparatus according to claim 5, wherein in the first mode, the exposure timing of the second exposure is determined so as to include the timing at which the light amount of flicker reaches a peak or a bottom, based on the detected light amount change period.

7. The imaging apparatus according to claim 5, further comprising;
a light metering unit; and
a light path change unit which changes light from the object into a first state where the light is guided to the imaging unit and a second state where the light is guided to the light metering unit,
wherein the periodical light amount change characteristic is detected based on a plurality of images which is obtained by a plurality of charge accumulations performed by the light metering unit in a charge accumulation time period which is shorter than one period of the light amount change of flicker, and
wherein the plurality of charge accumulations is performed when the light is in the second state by the light path change unit.

8. The imaging apparatus according to claim 1,
wherein the first exposure during the continuous shooting is an exposure for obtaining a first still image which is obtained first after a start of the continuous shooting is instructed, and
wherein the second exposure during the continuous shooting is an exposure for obtaining a second still image which is obtained next to the first still image after the start of the continuous shooting is instructed.

9. An imaging apparatus capable of continuous shooting, comprising:
an imaging unit; and
at least one processor that executes instructions stored in at least one memory
to detect a periodical light amount change characteristic of light from an object;
to determine an exposure timing of the imaging unit; and
to perform control to execute a first mode or a second mode which is different from the first mode during the continuous shooting, based on the periodical light amount change characteristic detected by executing a detecting process, before the continuous shooting is started,
wherein in the first mode, the imaging apparatus executes the detecting process in a period between first and second exposures of the imaging unit during the continuous shooting and an exposure timing of the second exposure is determined based on the periodical light amount change characteristic detected in the period,
wherein the first mode is executed during the continuous shooting, a change of an amount of light from the object changes in a predetermined period is detected, before the continuous shooting is started,
wherein the second mode is executed during the continuous shooting, if a change of the amount of light from the object changes in the predetermined period is not detected before the continuous shooting is started, and
wherein in the second mode, the imaging apparatus does not execute the detecting process in a period between the first and the second exposures during the continuous shooting.

* * * * *